United States Patent
Akiyama et al.

(10) Patent No.: US 7,463,575 B2
(45) Date of Patent: Dec. 9, 2008

(54) OPTICAL INFORMATION RECORDING MEDIUM, METHOD FOR MANUFACTURING THE SAME, AND INITIALIZATION DEVICE

(75) Inventors: Tetsuya Akiyama, Osaka (JP); Naoyasu Miyagawa, Hyogo (JP); Kenichi Nishiuchi, Osaka (JP); Takashi Nishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/463,977

(22) Filed: Aug. 11, 2006

(65) Prior Publication Data

US 2006/0292499 A1    Dec. 28, 2006

Related U.S. Application Data

(62) Division of application No. 10/171,239, filed on Jun. 12, 2002, now abandoned.

(30) Foreign Application Priority Data

Jun. 14, 2001  (JP)  ............... 2001-180590
Apr. 24, 2002  (JP)  ............... 2002-121782

(51) Int. Cl.
*G11B 7/26* (2006.01)
(52) U.S. Cl. ............ 369/284; 369/44.27; 369/44.37; 369/94; 369/275.2
(58) Field of Classification Search ............ None
See application file for complete search history.

(56) References Cited

U.S. PATENT DOCUMENTS

| 5,768,221 | A  | 6/1998  | Kasami et al. |
| 5,852,595 | A  | 12/1998 | Matsui |
| 5,871,881 | A  | 2/1999  | Nishida et al. |
| 6,574,180 | B2 | 6/2003  | Kurokawa et al. |
| 6,807,142 | B1 | 10/2004 | Nagata et al. |
| 6,850,474 | B2 | 2/2005  | Araki et al. |

FOREIGN PATENT DOCUMENTS

EP    1160773    12/2001

(Continued)

*Primary Examiner*—Jorge L Ortiz Criado
(74) *Attorney, Agent, or Firm*—Hamre, Schumann, Mueller & Larson, P.C.

(57) ABSTRACT

An optical information recording medium includes a plurality of recording layers, a reflectance of at least one of the plurality of the recording layers in a non-initialized state with respect to a light beam for initialization being smaller than a reflectance of the same in an initialized state with respect to the light beam for initialization. The recording layers are initialized by irradiating, among the plurality of recording layers, the recording layer positioned farther from a light beam irradiation side with the light beam prior to irradiating the recording layer positioned closer to the light beam irradiation side, so that the initialized recording layers have no initialization irregularities. In initialization, at a position at a same distance in a radial direction on the optical information recording medium, the recording layer positioned farther from a light beam irradiation side is irradiated with one light beam before the recording layer positioned closer to the light beam irradiation side is irradiated with another light beam so that the plurality of recording layers are initialized at the same time by a light beam projecting operation in which the light beams are focused at different positions. This ensures the initialization without irregularities within a short time.

4 Claims, 12 Drawing Sheets

FOREIGN PATENT DOCUMENTS

| | | |
|---|---|---|
| JP | 9-91700 | 4/1997 |
| JP | 10-162414 | 6/1998 |
| JP | 10-241212 | 9/1998 |
| JP | 2000-187894 | 7/2000 |
| JP | 20011023236 | 1/2001 |
| JP | 2001084655 | 3/2001 |
| WO | WO 0104888 | 1/2001 |

US 7,463,575 B2

OPTICAL INFORMATION RECORDING MEDIUM, METHOD FOR MANUFACTURING THE SAME, AND INITIALIZATION DEVICE

This application is a divisional of application Ser. No. 10/171,239, filed Jun. 12, 2002, which application is incorporated herein by reference.

BACKGROUND OF THE INVENTION

1. Field of the Invention

The present invention relates to an optical information recording medium having a plurality of recording layers to/from which information is recorded/reproduced by irradiation with laser light or the like, and an initializing method and an initialization device for initializing the optical information recording medium.

2. Related Background Art

Optical information recording media have drawn attention as large-capacity and high-density memories, and so-called erasable types of the same, which are rewritable, are being developed now. The erasable optical information recording media include a medium that includes as a recording layer a thin film that exhibits a phase transition between the amorphous state and the crystalline state, to which information is recorded and erased by thermal energy generated by the irradiation with laser light.

As the phase-change materials for the foregoing recording layers, films made of alloys composed of Ge, Sb, Te, In, etc. as principal components are known, for instance, a GeSbTe alloy. Information is recorded by forming recording marks, which are obtained by causing the recording layer partially to make a transition into amorphous phase. Generally, information is erased by crystallizing the recording marks in many cases. The transition to the amorphous state is achieved by heating the recording layer to above a melting point of the same and thereafter cooling the same. On the other hand, the crystallization is achieved by heating the recording layer to a temperature above a crystallization temperature and below the melting point. Moreover, the recording layer is formed generally by sputtering, but a thin film of the aforementioned phase-change material formed by sputtering exhibits an amorphous state in most cases. Therefore, it is necessary to make the recording layer assume a crystalline state prior to recording information. This process is called "initialization".

A conventional initialization device for performing the foregoing initialization has one optical head equipped with one light source and one objective lens, and initializes a desired area of the recording layer by irradiating the recording layer of the recording medium with a light beam emitted from the optical head while moving the optical head in a predetermined direction.

On the other hand, recently, the volume of information handled increases as the processing ability of information devices improves. Therefore, an increased-capacity recording medium capable of recording/reproducing at an increased speed has been demanded. To achieve such an increased capacity and an increased speed, a multilayer recording medium has been proposed, which is configured so as to include a plurality of recording layers, so that information can be recorded/reproduced to/from each of the recording layers from one side of the medium (e.g. JP 9(1997)-91700A).

However, the initializing method according to JP9(1997)-91700A initializes the recording layer closer to the beam irradiation side first, which results in a drawback in that the recording layers tend to have irregularities. More specifically, portions initialized have less transmittance of light because of crystallization, which hinders the recording layer farther from the foregoing side from being initialized uniformly.

Furthermore, in the case where the foregoing multilayer recording medium is initialized by a conventional initialization device, only one recording layer is initialized at once. Therefore, it is necessary to repeat the initializing operation a number of times equal to the number of recording layers, which results in a drawback in that a time required for the initialization increases significantly. Besides, whereas a short-wavelength light beam is employed for the recording/reproduction of a recording medium to increase the recording density of the medium, a long-wavelength light beam is employed for the initialization of the recording medium to increase a light intensity of the beam. Therefore, a light beam with a wavelength different from the optical design wavelength for the recording medium is used for the initialization, which destabilizes the focus servo that is for adjusting the focus position precisely to the recording layer. This incurs initialization irregularities in the recording layer, thereby deteriorating the performance of the recording medium. For a multilayer recording medium in particular, it is necessary to bring the focal position precisely to a specific recording layer among the plurality of recording layers, thereby making the foregoing problem more severe.

SUMMARY OF THE INVENTION

The present invention is to solve the above-described conventional problem, and it is an object of the present invention to provide a method for manufacturing an optical information recording medium and an initialization device that are superior in the stabilization of the focus servo and allow production of a multilayer recording medium having a plurality of recording layers within a short time, and to provide a high-performance multilayer recording medium without initialization irregularities in recording layers.

To achieve the foregoing objects, an optical information recording medium of the present invention includes a plurality of recording layers, in which a reflectance of at least one of the plurality of the recording layers in a non-initialized state with respect to a light beam for initialization is smaller than a reflectance of the same in an initialized state with respect to the light beam for initialization. The initialized recording layers have no initialization irregularities, by initializing the recording layers by irradiating, among the plurality of recording layers, the recording layer positioned farther from a light beam irradiation side with the light beam prior to irradiating the recording layer positioned closer to the light beam irradiation side.

Next, a manufacturing method of the present invention, in initializing the optical information recording medium having a plurality of recording layers, includes projecting different light beams to the plurality of recording layers, respectively. With respect to the position at the same distance in a radial direction on the optical information recording medium, the recording layer positioned farther from a light beam irradiation side is irradiated with one light beam before the recording layer positioned closer to the light beam irradiation side is irradiated with another light beam so that the plurality of recording layers are initialized at the same time by a light beam projecting operation in which the light beams are focused at different positions.

Next, another manufacturing method of the present invention is an initializing method for initializing an optical information recording medium having a plurality of recording layers, in which, in initializing at least one of the recording layers, a focus position control light beam different from a crystallization beam for crystallizing a recording layer is employed for controlling a focus position of the crystallization beam.

Next, an initialization device of the present invention is an initialization device for initializing an optical information recording medium having a plurality of recording layers, and the device includes a plurality of optical heads provided to face a same surface of the recording medium for irradiating different recording layers with light beams, respectively, and a transfer system for moving the optical heads in a predetermined initialization traveling direction. In the initialization device, among the plurality of optical heads, the optical head for irradiating the recording layer positioned farther from a light beam irradiation side among the plurality of recording layers is positioned ahead relative to the initialization traveling direction.

Next, another initialization device of the present invention includes at least one optical head and a transfer system for moving the optical head in a predetermined initialization traveling direction. In the initialization device, at least one of the optical heads includes an objective lens that is a single lens, a light source for emitting a crystallization beam for crystallizing a recording layer, and a light source for emitting a focus position control beam with an intensity with which the recording layer is not crystallized.

DETAILED DESCRIPTION OF THE INVENTION

Figure 1:
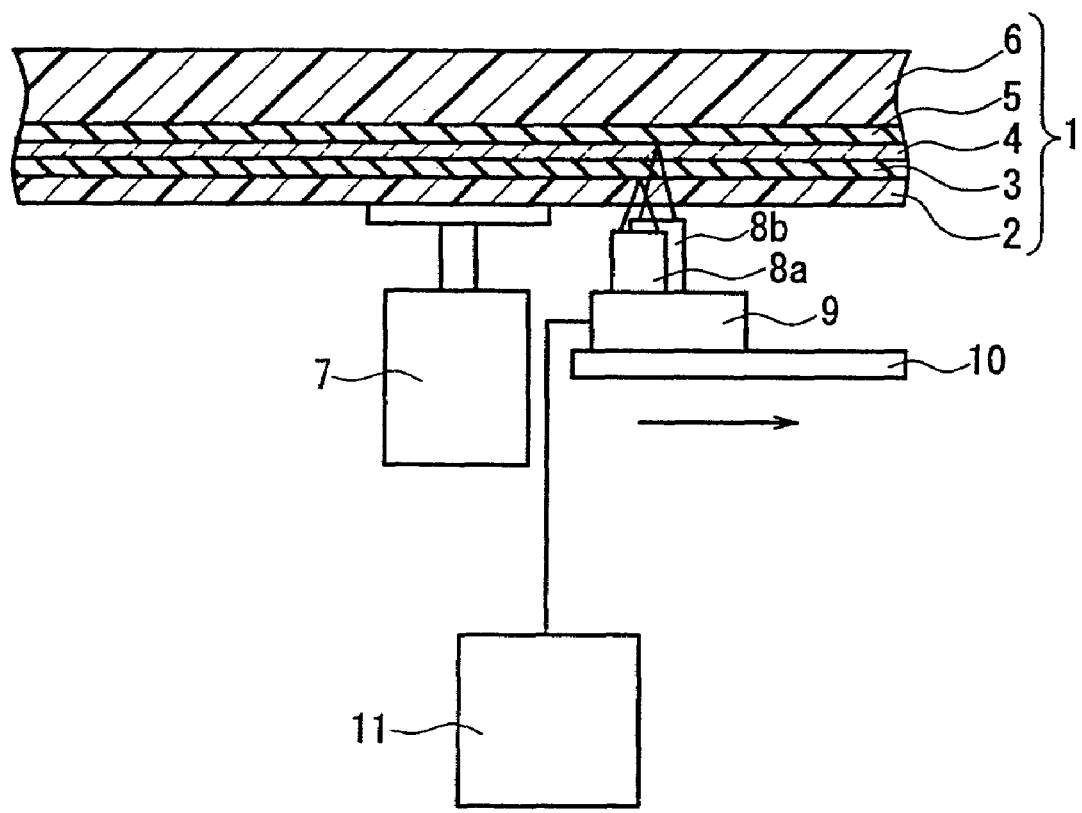
FIG. 1 is a partially cross-sectional view illustrating an initialization device for use with an optical information recording medium according to a first embodiment of the present invention.

In the optical information recording medium of the present invention, it can be determined, even from a recording medium already initialized, that a reflectance of at least one of the plurality of recording layers in a non-initialized state with respect to the initialization beam is smaller than a reflectance of the same in an initialized state. This is because non-initialized portions remain in a central part and/or peripheral part in an ordinary recording medium even after it is initialized.

It can be determined that the recording layers do not have initialization irregularities by measuring jitter (JIT) values of a reproduction signal after information is overwritten several times, or by checking whether recorded information can be reproduced normally.

Furthermore, the reflectance of the at least one of the plurality of recording layers in the non-initialized state with respect to the light beam for initialization may be not more than ½ of the reflectance in the initialized state. In other words, the reflectance after the initialization is not less than two times the reflectance in the non-initialized state.

Furthermore, the recording layer positioned farther from the light beam irradiation side and the recording layer positioned closer thereto are initialized at the same time by irradiation with one light beam, by focusing the light beam at different positions.

Furthermore, in the manufacturing method of the present invention, by initializing the plurality of recording layers at once from the recording layer farther from the light beam irradiation side by a light beam projecting operation in which different positions are focused, the initialization without initialization irregularities can be achieved within a shorter initialization time. More specifically, in the foregoing initializing method, it is possible to initialize a multilayer recording medium within a short time and to initialize a recording layer farther from the light beam irradiation side without the influence of initialization of a recording layer closer to the light beam irradiation side.

The light beams may be emitted from a plurality of optical heads, respectively, that are provided so as to face the same surface of the recording medium, and are moved in a predetermined initialization traveling direction, and among the plurality of recording layers, the recording layer positioned farther from the light beam irradiation side may be irradiated with the light beam emitted from the optical head positioned ahead relative to the initialization traveling direction, in the initialization of the plurality of recording layers at the same time.

Furthermore, the light beams emitted from at least two optical heads among the plurality of optical heads may form spots in different shapes from each other.

Furthermore, in initializing at least one of the recording layers, a focus position control light beam different from a crystallization beam for crystallizing a recording layer is employed for controlling a focus position of the crystallization beam. This allows the initialization to achieve the stabilization of focus servo, and it is possible to detect a position of a recording film with accuracy.

In initializing at least one of the recording layers, at an initial stage of the initialization, a focus position of an optical head is moved up and down, with a light beam having an intensity sufficient for initialization, so that the recording layer is crystallized partially. The partial crystallization causes the crystallized portions to have a higher reflectance, whereby a position of the recording film can be detected accurately. Consequently, the initialization method is allowed to achieve stabilization of focus servo even with respect to a recording medium whose recording layer has a small reflectance in an amorphous state.

In initializing at least one of the recording layers, at an initial stage of the initialization, a focus position is focused at a recording layer from which a greater reflected light amount may be obtained than a reflected light amount obtained from the target recording layer, and thereafter a focus position of an optical head is moved a predetermined distance in a thickness direction of the recording medium so that the target recording layer is initialized. This method also allows the position of the recording layer to be detected accurately.

A focus position may be focused at a recording layer from which a greater reflected light amount is obtained than a reflected light amount obtained from the target recording layer, with a light beam having an intensity with which the target recording layer is not crystallized. Thereafter a focus position of an optical head may be moved up and down with respect to a position at a predetermined distance therefrom in a thickness direction of the recording medium so that the target recording layer is crystallized partially. This method allows the position of the recording film to be detected accurately.

A focus position may be focused at a recording layer from which a greater reflected light amount is obtained than from the target recording layer, with a light beam having an intensity with which the target recording layer is not crystallized. Thereafter a focus position of an optical head is moved a predetermined distance in a thickness direction of the recording medium, and the intensity of the light beam is increased so as to be sufficient for initializing the target recording layer, so that the target recording layer is initialized. This method also allows the position of the recording layer to be detected accurately.

A positional relationship of the optical heads may be set so as to satisfy a relationship expressed as:

$$z > (x/2) + (y/2) + (d \cdot \tan \theta)$$

where x represents a spot width of a light beam for initializing the recording layer positioned closer to the light beam irradiation side, y and $\theta$ represent a spot width and an incident angle, respectively, of a light beam for initializing the recording layer positioned farther from the light beam irradiation side, z represents a distance between the light beams, and d represents a distance between the recording layers. This causes the recording layers to be initialized individually even if the plurality of recording layers are initialized simultaneously, and are not subjected to the influence of another initialization operation. Therefore, it is possible to prevent initialization irregularities from occurring.

Next, an initialization device of the present invention initializes a multilayer recording medium within a short time, and makes it possible to initialize a recording layer positioned farther from the light beam irradiation side without the influence of initialization of the recording layer positioned closer to the light beam irradiation side. The device preferably includes a spindle motor for rotating the recording medium, a plurality of optical heads for irradiating different recording layers in the recording medium with light beams emitted therefrom, respectively, a transfer mount on which the optical heads are mounted, and a transfer system for moving the transfer mount to a predetermined position. The plurality of optical heads are arranged so that light beams emitted from the optical heads are projected to the recording medium at different positions in a radial direction of the recording medium.

Furthermore, the plurality of optical heads preferably are mounted on one transfer mount. This allows the device to be simplified in configuration and reduced in size.

Furthermore, optimal substrate thicknesses for the optical heads may be different from each other, the optimal substrate thicknesses being obtained by optimizing substrate thicknesses through which the light beams emitted from the optical heads pass while being converged to form spots on the recording layers, respectively, so as to make the formed spots have minimum diameters, respectively. This allows the optical heads to focus light beams on target recording layers, respectively, whereby stable initialization without irregularities can be achieved.

Furthermore, at least one of the plurality of optical heads may include a driving system for moving an objective lens equipped in the optical head, a counter for counting up-and-down movements of the objective lens, and a controller for controlling an intensity of the light beam emitted from the optical head and for controlling the driving system. With this configuration, by moving the focus position of the optical head up and down to partially crystallize the recording layer with a light beam having an intensity sufficient for initialization, the device is capable of carrying out initialization with stable focus servo, even with respect to a recording medium having an extremely small reflectance of the recording layer in amorphous state.

Furthermore, the optical heads may be provided facing the same surface of the recording medium and project light beams to different recording layers, respectively, and among the plurality of optical heads, the optical head for irradiating the recording layer positioned farther from a light beam irradiation side among the plurality of recording layers may be positioned ahead relative to the initialization traveling direction.

Furthermore, the foregoing optical head may include an objective lens and a plurality of light sources, and the initialization device further include an optical path correction system positioned on an optical path of one light beam emitted from at least one of the optical sources. This allows a light beam emitted from one light source to be focused on one specific recording layer by moving the objective lens, and allows a light beam emitted from another light source to be focused on another recording layer by means of the foregoing optical path correction system. In other words, even in the case where the distance between the recording layers in the recording medium is different from the designed value or in the case where the distance varies, the focuses of light beams emitted from a plurality of light sources can be focused accurately on target recording layers, respectively, at the same time, whereby stable initialization without irregularities can be achieved. In the foregoing configuration, the objective lens preferably is a single lens.

Furthermore, the foregoing optical path correction system preferably is a liquid crystal element or a lens.

Furthermore, the wavelengths of light beams of the plurality of the light sources may be different from each other.

As described above, the method for manufacturing an optical information recording medium and the initialization device of the present invention allow a multilayer recording medium having a plurality of recording layers to be initialized stably without irregularities, with stable focus servo within a short time. Furthermore, the optical information recording medium of the present invention is a high-performance multilayer recording medium having recording layers without initialization irregularities.

EMBODIMENTS

The following will describe optical information recording media, methods for manufacturing the same, and initialization devices for use with the same according to the present invention, while referring to the drawings.

First Embodiment

FIG. 1 is a view illustrating a configuration of an initialization device for use with an optical information recording medium according to the first embodiment of the present invention, and illustrates a state in which an information recording medium 1 having two recording layers is placed. The recoding medium 1 is formed in the following manner. On an approximately 1.1 mm thick substrate 6 made of polycarbonate, a first recording layer 5, an approximately 0.04 mm thick transparent separation layer 4, and an approximately 100 nm thick second recording layer 3 composed of a semi-transparent layer are formed successively in the stated order, and further a protective film 2 is formed thereon. In the recording layers 3 and 5, guiding grooves (not shown) with a depth of approximately 20 nm and a width of approximately 0.2 μm are arranged at a track pitch of approximately 0.32 μm, for tracking a laser light during recording/reproduction.

Figure 12:
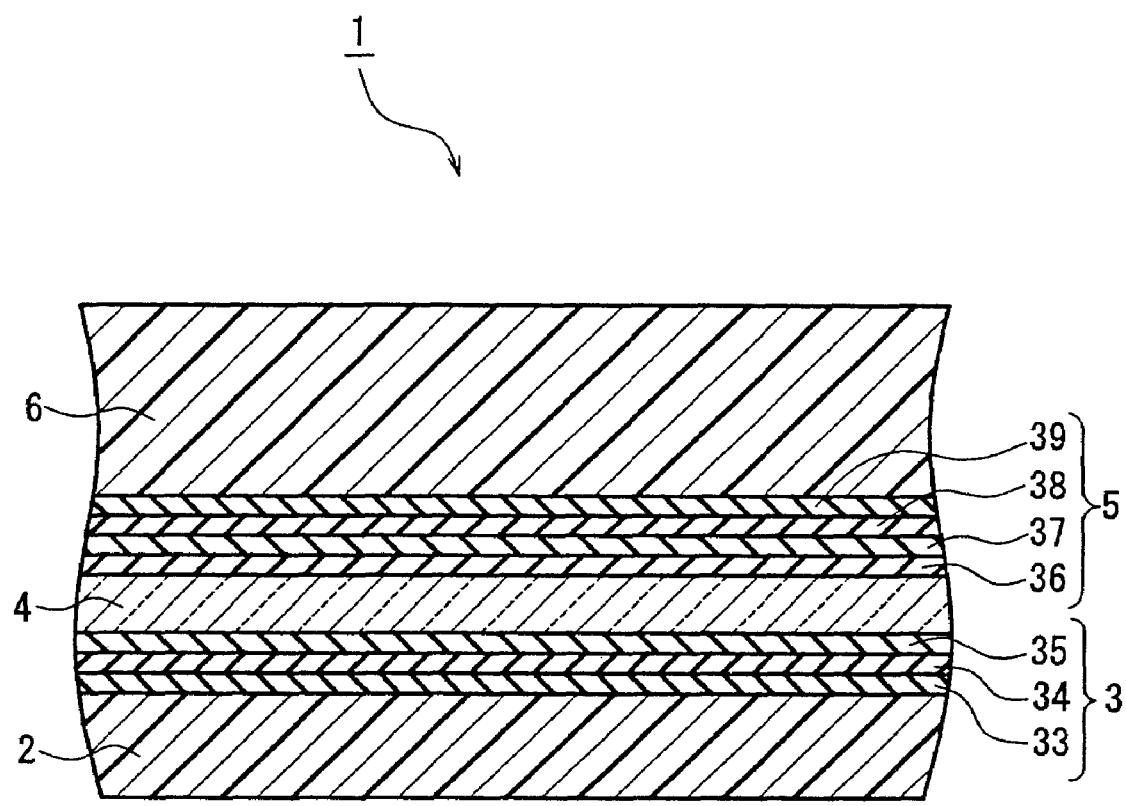
FIG. 12 is a cross-sectional view illustrating an example of an optical information recording medium of the present invention.

FIG. 12 illustrates a more detailed structure of the recording medium 1. In FIG. 12, the recording layer 3 is a multilayer thin film that includes a protective layer 33 made of a dielectric material ($ZnS$—$SiO_2$, 50 nm thick), a phase-change layer 34 composed of a GeSbTe thin film (7 nm thick), and a protective layer 35 made of a dielectric material ($ZnS$—$SiO_2$, 40 nm thick). A transition of the phase-change layer 34 from the amorphous state to the crystalline state upon initialization or the like increases a reflectance and decreases a transmittance of the same. The recording layer 5 is a multilayer thin film that includes a protective layer 36 made of a dielectric material ($ZnS$—$SiO_2$, 60 nm thick), a phase-change layer 37 composed of a GeSbTe thin film (10 nm thick), a protective layer 38 made of a dielectric material ($ZnS$—$SiO_2$, 30 nm thick), and a reflection layer 39 made of a metal material (Ag alloy, 100 nm thick). A transition of the phase-change layer 37 from the amorphous state to the crystalline state increases a reflectance. It should be noted that the transparent separation layer 4 is made of an ultraviolet-hardening resin, and the protective layer 2 is made of a polycarbonate sheet with a thickness of 0.07 mm and an ultraviolet-hardening resin with a thickness of 0.01.

In FIG. 1, the initialization device is composed of a spindle motor 7, two optical heads 8a and 8b, a transport mount 9 on which the optical heads are mounted, a transfer system 10 for moving the transport mount to a desired position, and a controller 11.

Figure 2:
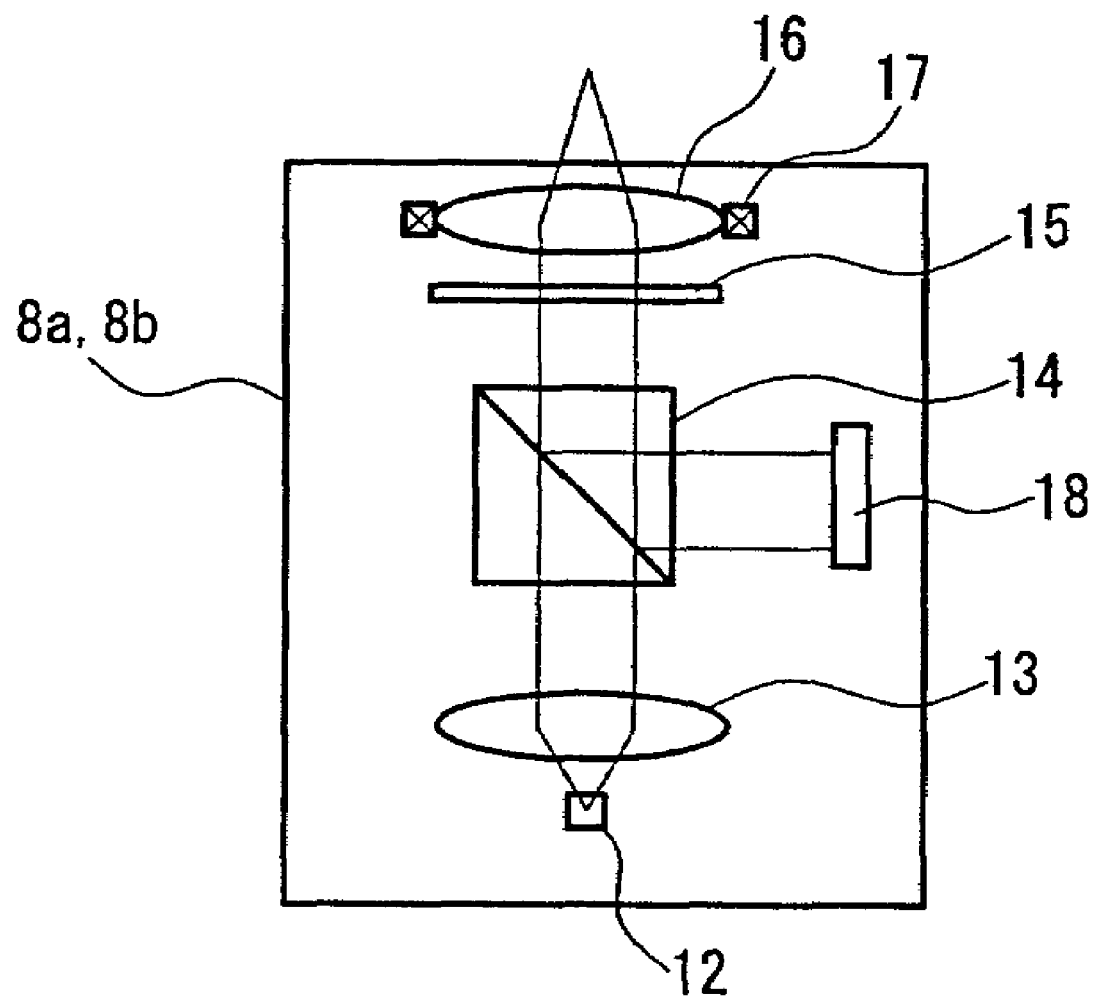
FIG. 2 is a view illustrating a configuration of a principal part of the initialization device for use with an optical information recording medium according to the first embodiment of the present invention.

FIG. 2 illustrates a structure of the optical heads 8a and 8b. In the optical heads, a light beam emitted from a light source 12 made of a semiconductor laser with a wavelength of 800 nm passes through a collimator lens 13, a beam splitter 14, a quarter-wavelength plate 15, and an objective lens 16, thereby being focused on a recording medium. The light beam is focused on the recording layer of the recording medium by adjusting the position of the objective lens 16 by a voice coil 17. Light reflected from the recording layer passes again through the objective lens 16 and the quarter-wavelength plate 15, and is reflected by the beam splitter 14, thereby entering a detector 18, where it is converted into electric signals for use in the control of the voice coil 17.

In FIG. 1, light beams emitted from the optical heads 8a and 8b are focused on the recording layers 3 and 5, respectively, in the aforementioned manner. A spot of each light beam on the recording layer is in a prolonged ellipsoidal shape with a dimension of 100 μm in a radial direction of the recording medium and a dimension of 1 μm in a circumferential direction. Furthermore, the optical head 8b is positioned approximately 1 mm to a peripheral side of the recording medium relative to the optical head 8a. For initialization, while the spindle motor 7 on which the recording medium 1 is placed is rotated, the optical heads 8a and 8b are moved by the transfer mount 9 from the center part to the periphery of the recording medium at a transfer pitch of 50 μm per one revolution of the recording medium, with the light beams maintained in a state of being focused on the recording layers. Here, the rotation of the spindle motor 7 is controlled so that a linear velocity at the position of the optical head 8a is kept substantially constant. This process allows the recording layers 3 and 5 to be initialized simultaneously, thereby allowing for the initialization of a multilayer recording medium with a plurality of recording layers within a short time.

Here, the optical head 8b is positioned closer to the periphery of the recording medium, i.e., with a deviation in the moving direction of the optical heads, relative to the optical head 8a. Therefore, at a certain position on the recording medium, the initialization of the recording layer 3 is executed after the initialization of the recording layer 5. In other words, the initialization of the recording layer 5 is carried out by the irradiation with the light beam having passed through the recording layer 3 in a non-initialized state (i.e., having a high transmittance). Therefore, the following effect can be achieved: the initialization of the recording layer 5 is implemented efficiently with the attenuation of the light beam intensity caused by the recording layer 3 being suppressed to a small level, and furthermore, without the influence of initialization irregularities of the recording layer 3. Therefore, an optical information recording medium obtained in the present embodiment is a high-performance multilayer recording medium having recording layers without initialization irregularities.

Here, the initialization irregularities are defined as partial or complete insufficient crystallization in the recording layers. In recording information, the jitter values indicative of qualities of signals vary upon each overwriting before the crystallization state of the recording layers are stabilized, thereby in some cases incurring a problem in that the recorded information cannot be reproduced normally. The variation of the jitter values preferably is within 2%, and the initialization irregularity indicates a state with a variation exceeding the foregoing range.

An overwriting test was carried out with respect to a multilayer recording medium according to the present embodiment, with a laser light having a wavelength of 405 nm that was converged by an objective lens with a NA of 0.85, at a linear velocity of 5.3 m/s. The signals were random signals recorded by the PWM recording method in which information was recorded according to the lengths of marks and spaces (that is, edge positions of a front end and rear end of a mark) and modulated by the 1-7 PP method with a reference clock T of 15.1 nsec. The laser light was modulated in a pulse form according to the signals to be recorded and projected. The peak power and the bottom power of the same were so as to be 10 mW and 4 mW, respectively, with respect to the recording layer 3, and to be 10 mW and 5 mW with respect to the recording layer 5. The peak power and the bottom power were selected so that the jitter values when the random signals were overwritten ten times with different power values were minimized. Under the foregoing conditions, the overwriting operation was carried out ten times, and a jitter value of reproduction signals in each operation was measured. Consequently, the jitter values for the recording layers 3 and 5 both were in a range of 10 to 11%. In other words, the variation of the jitter value was within 1%, and no initialization irregularities were observed.

On the other hand, in the case where the medium was initialized by a conventional method in which the recording layer 3 closer to the light beam irradiation side was initialized first and the identical overwriting test was carried out, the jitter value for the recording layer 5 varied in 10 to 14% in the first to tenth overwriting operations, and thus, initialization irregularities were observed.

Figure 3:
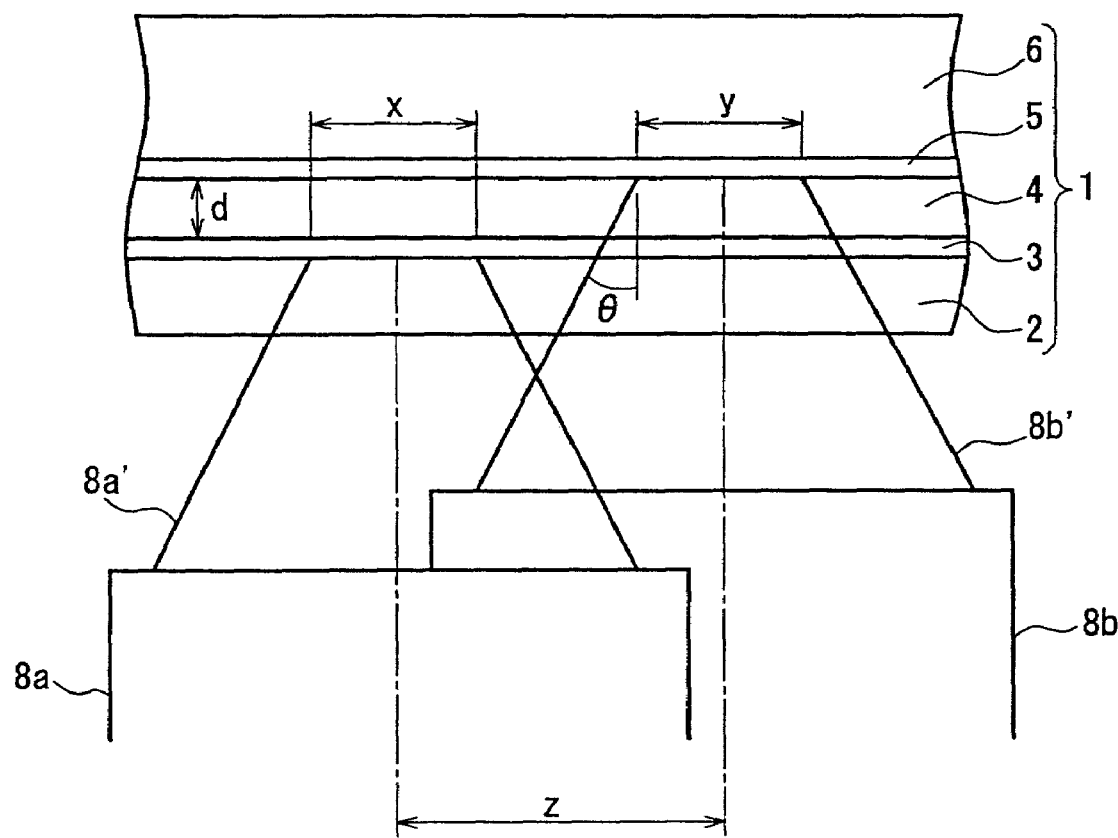
FIG. 3 is a cross-sectional view illustrating a principal view illustrating an optical information recording medium according to the first embodiment of the present invention.

The following will describe a preferable positional relationship between the optical heads 8a and 8b. FIG. 3 is a cross-sectional view taken in a radial direction of a portion of the recording medium 1 irradiated with the light beam shown in FIG. 1. A position relationship between the optical heads 8a and 8b preferably is set so that a relation shown below is satisfied:

$$z > (x/2) + (y/2) + (d \cdot \tan \theta)$$

where z represents a distance between radial locations on the recording medium 1 of the center lines of light beams 8a' and 8b' emitted from the optical heads 8a and 8b, respectively, x represents a spot length in the radial direction of the light beam 8a' on the recording layer 3, y represents a spot length in the radial direction of the light beam 8b' on the recording layer 5, θ represents an incident angle of the light beam 8b', and d represents a thickness of the transparent separation layer.

Here, the distance z between the radial locations preferably is in a range of 0.1 to 2 mm, the spot lengths x and y preferably are in a range of 50 to 200 μm each, the incident angle θ of the light beam preferably is in a range of 0.3 to 0.7, and the thickness d of the transparent separation layer preferably is in a range of 10 to 60 μm.

In the above-described configuration, a length from a spot center of the light beam 8a' on the recording layer 3 to an end of the same spot in the radial direction is x/2, a length from a spot center of the light beam 8b' on the recording layer 3 to an end of the same spot in the radial direction is (y/2)+(d·tan θ), and the distance z between the centers of the spots of the light beams 8a' and 8b' is greater than a sum of the foregoing two lengths, (x/2)+(y/2)+(d·tan θ). This means that the light beams 8a' and 8b' never overlap on the recording layer 3. In other words, the light beam 8b" is projected on the recording layer 5 without passing through the recording layer 3 in the initialized state. It should be noted that if the distance z between the radial locations of the light beams 8a' and 8b' on the recording medium 1 is increased excessively, a wait time from the start of the initialization of the recording layer 5 to the start of the initialization of the recording layer 3 is prolonged, thereby causing the time required for the initialization of the entirety to increase: the distance z can be set in a range tolerated according to a cycle time (a time for the initialization of one recording medium). It should be noted the incident angle θ of the light beam has a relationship expressed as:

$$NA = n \cdot \sin \theta$$

where NA represents a numerical aperture of the objective lens, and n represents a refractive index of the substrate.

Furthermore, since the optical heads 8a and 8b are mounted on the same transfer mount, the transfer mechanism and a control circuit for the same may be identical to those in the case where one optical head is provided. Therefore, the following effects can be achieved: it is possible to suppress the growth in size of the device due to the provision of two optical heads, and to set the two optical heads with a precise positional relationship.

The following will describe an example of an optical head that is designed so that substrate thicknesses, through which the light beams emitted from the optical heads 8a and 8b pass while being converged to form spots on the recording layers 3 and 5, respectively, are optimized so as to make the formed spots have minimum diameters, respectively, according to the respective optimal distances therefrom to the recording layers 3 and 5.

In FIG. 1, an optical system for the optical head 8a is designed so that the optimal substrate thickness for the same is 0.08 mm, while an optical system for the optical head 8b is designed so that the optimal substrate thickness for the same is 0.12 mm. This means that a light beam emitted from the optical head 8a to the recording medium 1 focuses after passing the protective film with a thickness of 0.08 mm, that is, at the recording layer 3, without aberration. On the other hand, a light beam emitted from the optical head 8b to the recording medium 1 focuses after passing the protective film with a thickness of 0.08 mm, the recording layer 3 with a thickness of 100 nm, and the transparent separation layer with a thickness of 0.04 mm, that is, at the recording layer 5, substantially without aberration. Therefore, it is possible for the optical heads to focus the light beams precisely on the target recording layers, respectively, whereby the stable initialization without irregularities can be achieved.

In the foregoing embodiment, the spots of the light beams emitted from the optical heads 8a and 8b and formed on the recording layers have the same shape, but the spots may have different shapes. Since the recording layers 3 and 5 have different thermal characteristics due to their different structures, the layers have different temperature distributions when they are irradiated with the light beams, even if the spot shapes of the light beams irradiating the same are identical to each other. Therefore, by forming the spots in shapes suitable for the thermal characteristics of the recording layers to be initialized, it is possible to achieve the stable initialization without irregularities.

Figure 4:
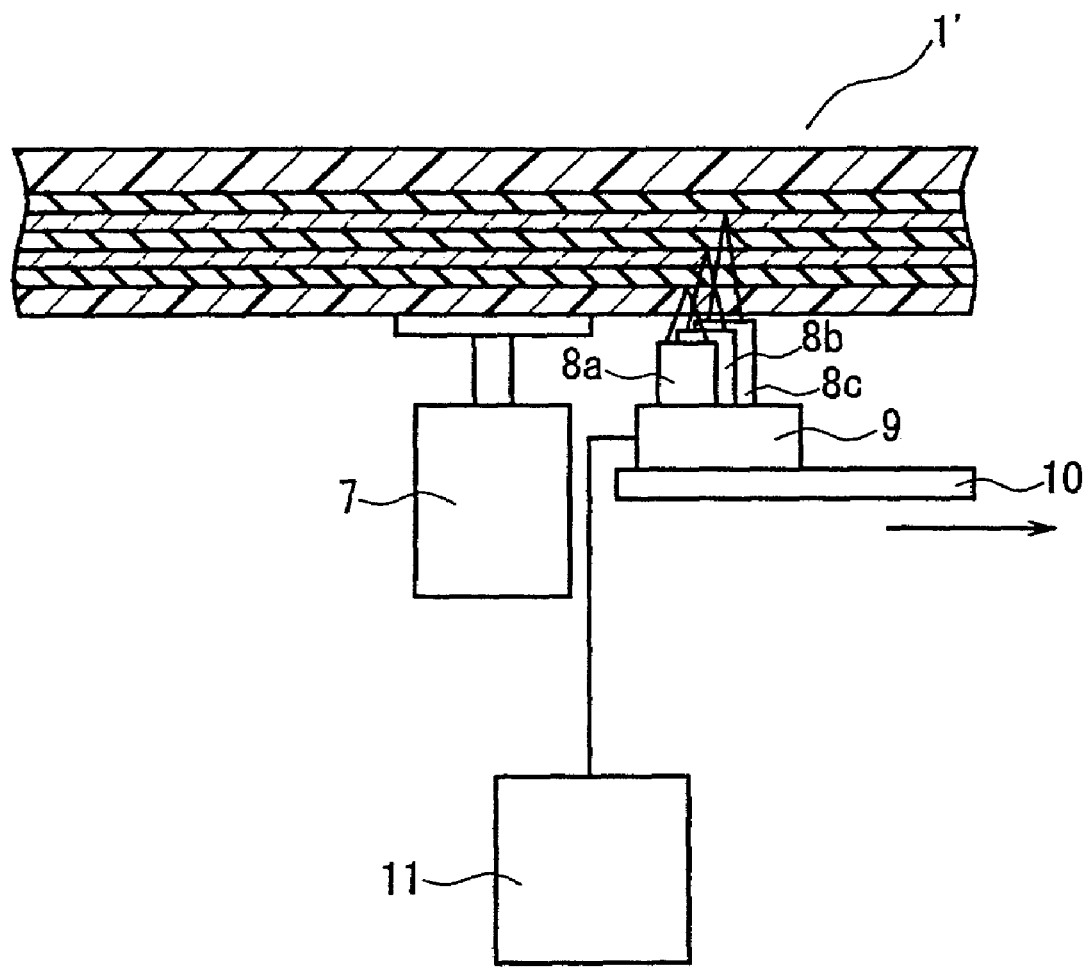
FIG. 4 is a partially cross-sectional view illustrating a configuration of an initialization device for use with an optical information recording medium according to the first embodiment of the present invention.

Furthermore, the foregoing embodiment is described referring to a combination of an initialization device having two optical heads and a recording medium having two recording layers, but three or more optical heads may be provided. In the initialization of a recording medium with n recording layers, by matching the number of optical heads with the number of the recording layers, it is possible to achieve an initialization speed n times higher than that in the case where only one optical head is provided. FIG. 4 illustrates a configuration in which three optical heads are provided, which is used with respect to an information recording medium 1' having three recording layers. The configuration is identical to that of the initialization device shown in FIG. 1, except that a third optical head 8c is provided. Furthermore, the optical head 8c has an identical configuration to that of the optical heads 8a and 8b shown in FIG. 2. The optical head 8c projects a light beam to a recording layer positioned farthest from the beam irradiation side in the recording medium 1' to initialize the recording layer, and it is arranged ahead relative to the moving direction among the three optical heads. This makes it possible to initialize a recording medium having three recording layers also within a short time, and to carry out the initialization of the recording layer positioned farthest from the beam irradiation side without the influence of initialization irregularities of the recording layers positioned closer to the beam irradiation side, as in the case where a recording medium having two recording layers is initialized by the initialization device with two optical heads shown in FIG. 1.

Furthermore, the moving direction of the optical heads during the initialization may be directed from the periphery of the recording medium to the center of the same. In this case, the optical head 8b is arranged on a side closer to the center of the recording medium relative to the optical head 8a, so as to be ahead relative to the optical head moving direction.

Second Embodiment

Figure 5:
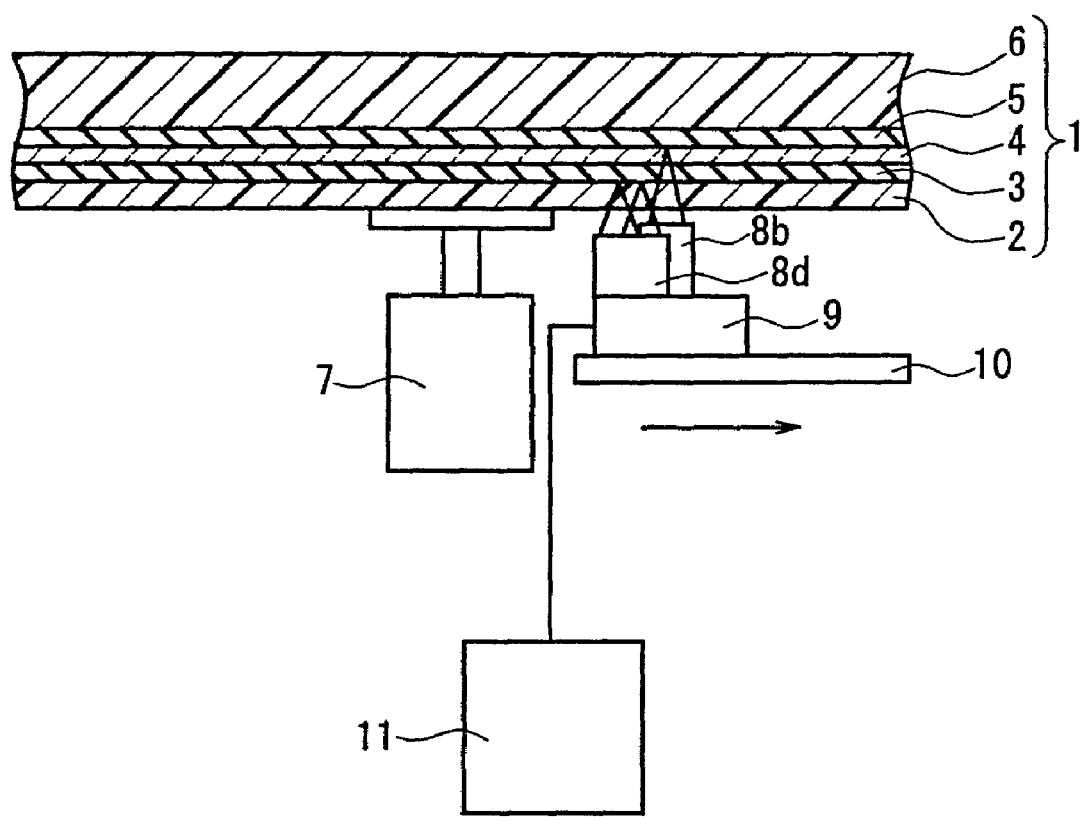
FIG. 5 is a partially cross-sectional view illustrating an initialization device for use with an optical information recording medium according to a second embodiment of the present invention.

FIG. 5 is a view illustrating a configuration of an initialization device of an optical information recording medium according to the second embodiment of the present invention, in a state of being used with respect to an information recording medium 1. The initialization device has an identical configuration as that of the initialization device for use with an optical information recording medium according to the first embodiment, which is shown in FIG. 1, except for the optical heads.

Figure 6:
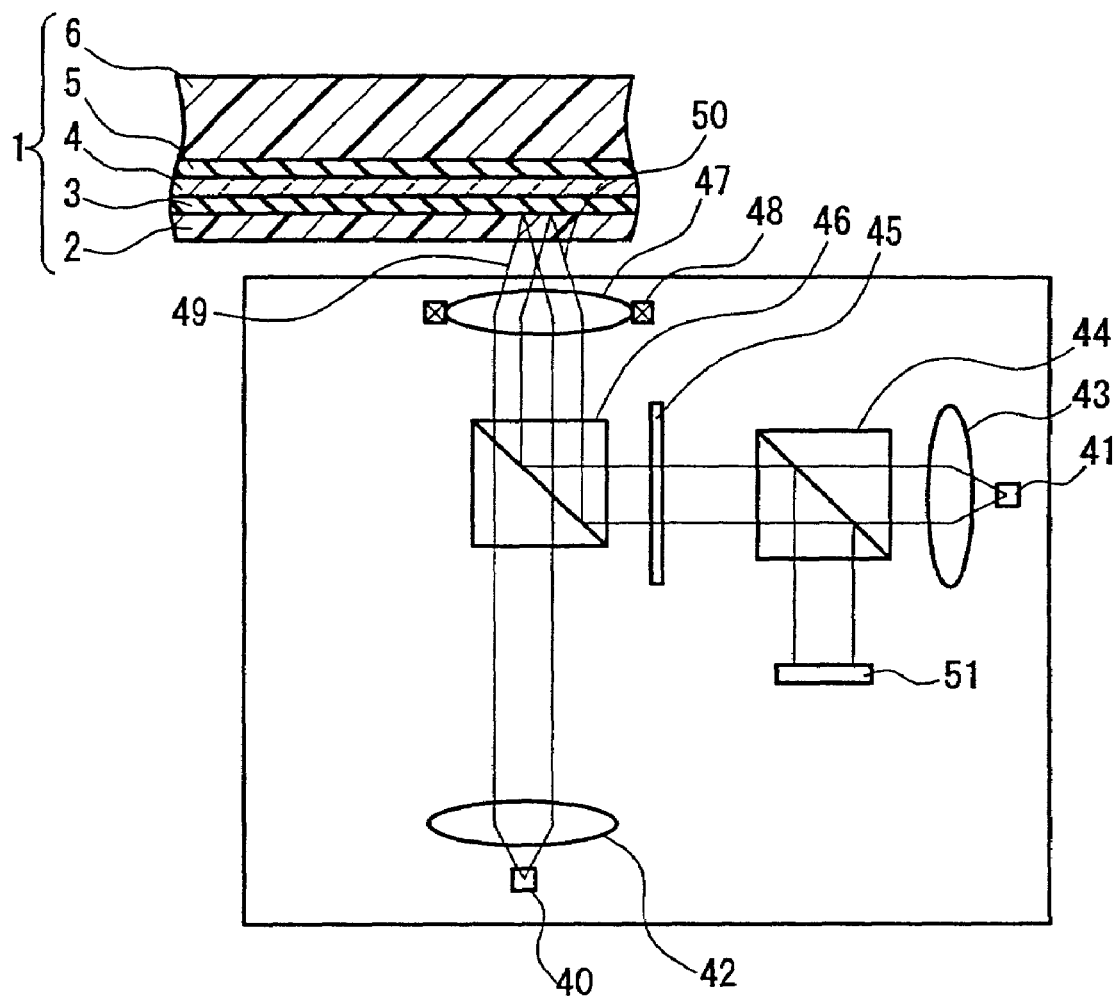
FIG. 6 is a partially cross-sectional view illustrating a configuration of a principal element of an initialization device of an optical information recording medium according to the second embodiment of the present invention.

An optical head 8d has an objective lens which is a single lens, a light source for emitting a crystallization beam for crystallizing a recording layer, and a light source for emitting a focus position control beam with an intensity such that the beam does not crystallize the recording layer. FIG. 6 illustrates the configuration of the same.

The foregoing optical head includes light sources 40 and 41 composed of semiconductor lasers with wavelengths of 800 nm and 680 nm, respectively.

In FIG. 6, a wavelength-selective mirror 46 transmits light with a wavelength at a level of the light emitted from the light source 40, and reflects light with a wavelength at a level of the light emitted from the light source 41. The light beam emitted from the light source 40 passes through the wavelength-selective mirror 46, and is focused by the objective lens 47 on a recording layer as the crystallization beam 49. On the other hand, the light beam emitted from the light source 41 passes through a collimator lens 43, a beam splitter 44, and a quarter-wavelength plate 45, is reflected by the wavelength-selective mirror 46, and is focused by the objective lens 47 on a recording layer of the recording medium as the focus position control beam 50. The focus position control beam 50 reflected from the recording layer again passes through the objective lens, is reflected by the wavelength-selective mirror 46, passes through the quarter-wavelength plate 45, and is reflected by the beam splitter 44, thereby entering a detector 51, where the beam is converted into electric signals. The electric signals are used for controlling a voice coil 48 to adjust the position of the objective lens 47 so that the crystallization beam 49 is focused on the recording layer.

The foregoing initialization device is effective in particular for initializing a recording medium having a very low reflectance with respect to the wavelength of the crystallization beam when the recording layer 3 is in an amorphous state. Normally, a multilayer recording medium is designed optically so that a recording layer closer to the beam irradiation side has a greater transmittance, in order to facilitate the recording and reproduction with respect to a recording layer farther from the beam irradiation side. Accordingly, the recording layer closer to the beam irradiation side has a smaller reflectance.

An optical information recording medium according to an embodiment of the present invention has a configuration identical to the multilayer recording medium shown in FIG. 12, except for the film thicknesses of the layers.

The reflectances and transmittances of the recording layer have wavelength dependency, and with respect to light with a wavelength of 800 nm, the recording layer 3 in the amorphous state has a reflectance of 1% and a transmittance of 60%, while the recording layer 5 in the crystalline state has a reflectance of 10%. Besides, with respect to light with a wavelength of 680 nm, the recording layer 3 in the amorphous state has a reflectance of 3% and a transmittance of 50%, while the recording layer 5 in the crystalline state has a reflectance of 8%.

The initialization of the recording layer 5 is carried out prior to the initialization of the recording layer 3, for instance, so as not to be influenced by initialization irregularities of the recording layer 3. Therefore, when the recording layer 3 is initialized, the recording layer 3 is in the amorphous state while the recording layer 5 is in the crystalline state.

Here, upon the irradiation with the crystallization beam with a wavelength of 800 nm, 1% of the light is reflected from the recording layer 3, whereas 3.6% (10%×60%×60%) of the light is reflected from the recording layer 5. Therefore, in the case where a common technique such as the knife-edge method or the astigmatism method is used for focusing the light beam, an intensity ratio between a focus error signal obtained from the recording layer 3 and a focus error signal obtained from the recording layer 5 is 1/3.6.

Figure 7A:
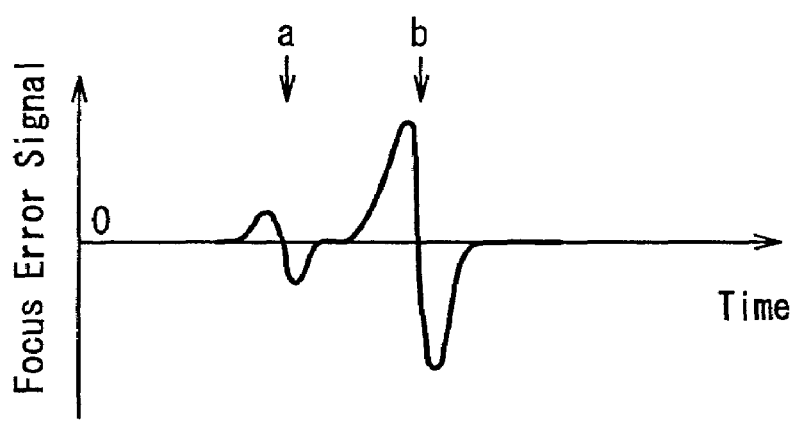
FIGS. 7A and 7B are waveform diagrams illustrating examples of focus error signals obtained from the initialization device for use with an optical information recording medium according to the second embodiment of the present invention.

FIG. 7A illustrates the intensities of focus error signals obtained from the recording layers: an arrow a indicates a sigmoidal curve representing a signal from the recording layer 3; and an arrow b indicates a sigmoidal curve representing a signal from the recording layer 5. The focus error signal from the recording layer 5 has an intensity three times or more that of the focus error signal from the recording layer 3. Therefore, in the case of the recording layer 1 in which a distance between the recording layer 3 and the recording layer 5 is as short as 0.04 mm, it is difficult to make the focus error signals obtained from the recording layers 3 and 5, that is, the sigmoidal curves, distinct from each other. As a result, the light beam is focused on the recording layer 5 with a greater amount of reflected light therefrom, and it is difficult to focus the light beam on the recording layer 3 with a smaller amount of reflected light therefrom. Thus, it is difficult to initialize the recording layer 3 by focusing the crystallization beam thereon.

On the other hand, the initialization device in the present embodiment employs the focus position control beam with a wavelength of 680 nm to control the focus position of the crystallization beam. With irradiation with a light beam with a wavelength of 680 nm, 3% of the light is reflected from the recording layer 3, while 2.5% (10%×50%×50%) of the light is reflected from the recording layer 5.

Figure 7B:
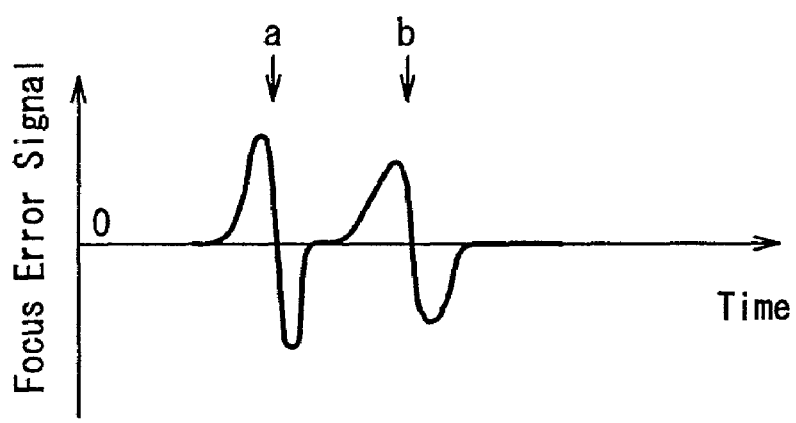

Therefore, an intensity ratio between the focus error signals obtained from the recording layers 3 and 5 is 3/2.5. FIG. 7B illustrates the intensities of the focus error signals obtained from the recording layers: an arrow a indicates a sigmoidal curve representing a signal from the recording layer 3; and an arrow b indicates a sigmoidal curve representing a signal from the recording layer 5. The focus error signal from the recording layer 3 has a greater intensity, which ensures the focusing on the recording layer 3.

Therefore, the optical information recording layer having a plurality of recording layers according to the present embodiment is a high-performance multilayer recording medium without initialization irregularities in recording layers.

It should be noted that the wavelengths of the crystallization beam and the focus position control beam can be set appropriately according to optical characteristics of a recording medium.

Third Embodiment

Figure 8:
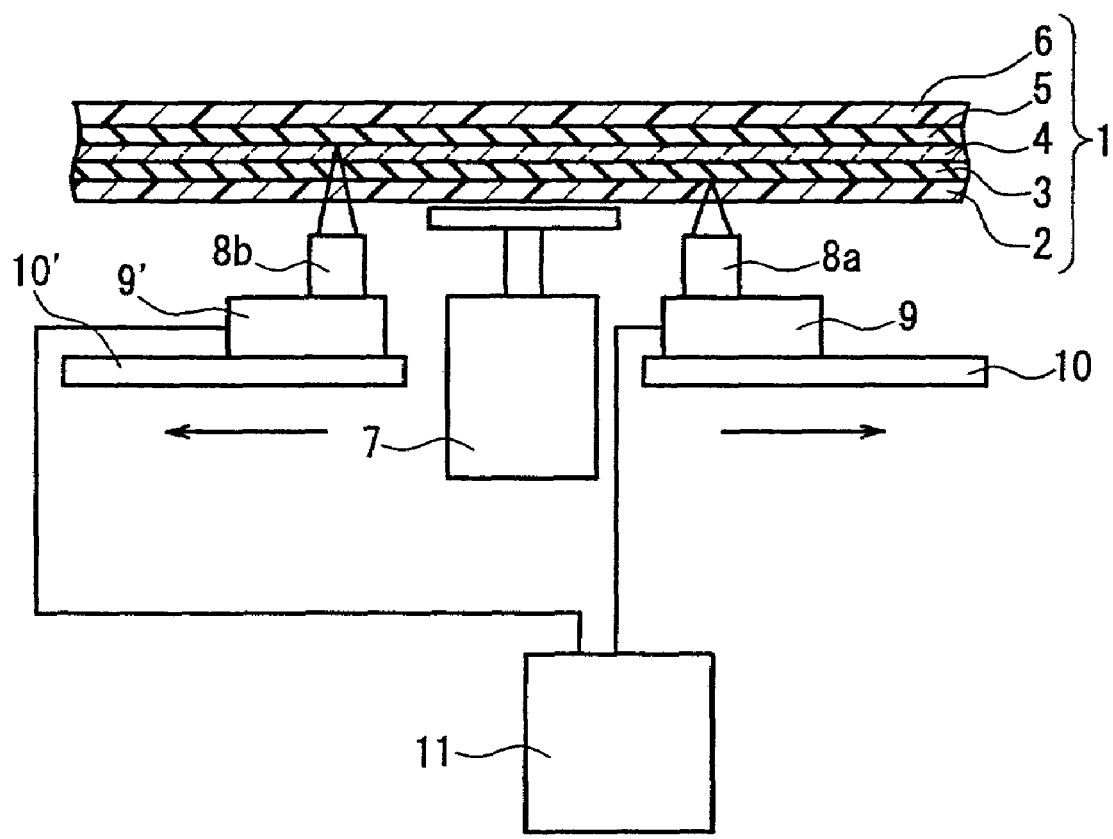
FIG. 8 is a partially cross-sectional view illustrating an initialization device for use with an optical information recording medium according to a third embodiment of the present invention.

FIG. 8 is a view illustrating a configuration of an initialization device for use with an optical information recording medium according to the third embodiment of the present invention, in a state of being used with respect to the information recording medium 1 having two recording layers, which is described in conjunction with the first embodiment. The configuration is identical to that of the initialization device for an optical information recording medium according to the first embodiment shown in FIG. 1 except that the optical heads 8a and 8b are mounted on individual transfer mounts 9 and 9', respectively.

Light beams emitted from the optical heads 8a and 8b are focused on the recording layers 3 and 5, respectively. A spot of each light beam on the recording layer is in a prolonged ellipsoidal shape with a dimension of 100 μm in a radial direction of the recording medium and a dimension of 1 μm in a circumferential direction. Furthermore, the optical head 8b is positioned approximately 1 mm toward a peripheral side of the recording medium relative to the optical head 8a. For initialization, while the spindle motor 7 on which the recording medium 1 is placed is rotated, the optical heads 8a and 8b are moved by the transfer mounts 9 and 9' from the center part to the periphery of the recording medium at a transfer pitch of 50 μm per one revolution of the recording medium, with the light beams maintained in a state of being focused on the recording layers. Here, the rotation of the spindle motor 7 is controlled so that a linear velocity at the position of the optical head 8a is kept substantially constant. This process allows the recording layers 3 and 5 to be initialized simultaneously, thereby allowing for the initialization of a multilayer recording medium with a plurality of recording layers within a short time.

Here, the optical head 8b is positioned closer to the periphery of the recording medium, i.e., in the moving direction of the optical heads, relative to the optical head 8a. Therefore, at a given position on the recording medium, the initialization of the recording layer 3 is executed after the initialization of the recording layer 5. In other words, the initialization of the recording layer 5 is carried out by the irradiation with the light beam having passed through the recording layer 3 in a non-initialized state (i.e., having a high transmittance). Therefore, the following effect can be achieved: the initialization of the recording layer 5 is implemented efficiently with the attenuation of the light beam intensity caused by the recording layer 3 being suppressed to a small level, and furthermore, without the influence of initialization irregularities of the recording layer 3.

Furthermore, by providing the optical heads 8a and 8b on individual transfer mounts, an advantage can be achieved in that a conventional transfer mechanism can be employed, thereby reducing the production cost, though the device scale increases slightly.

It should be noted that the moving direction of the optical heads during the initialization can be directed from the periphery to the center of the recording medium. In this case, the optical head 8b is arranged on a side closer to the center of the recording medium relative to the optical head 8a, so as to be ahead relative to the optical head moving direction.

Furthermore, as in the initialization device according to the second embodiment, two light sources that are for emitting a crystallization beam and for emitting a focus position control beam may be provided in the optical head.

Fourth Embodiment

The fourth embodiment of the present invention relates to an initializing method and an initialization device for initializing an optical information recording medium having a plurality of recording layers, among which one recording layer closer to the beam irradiation side has a small reflectance in the amorphous state.

Figure 9:
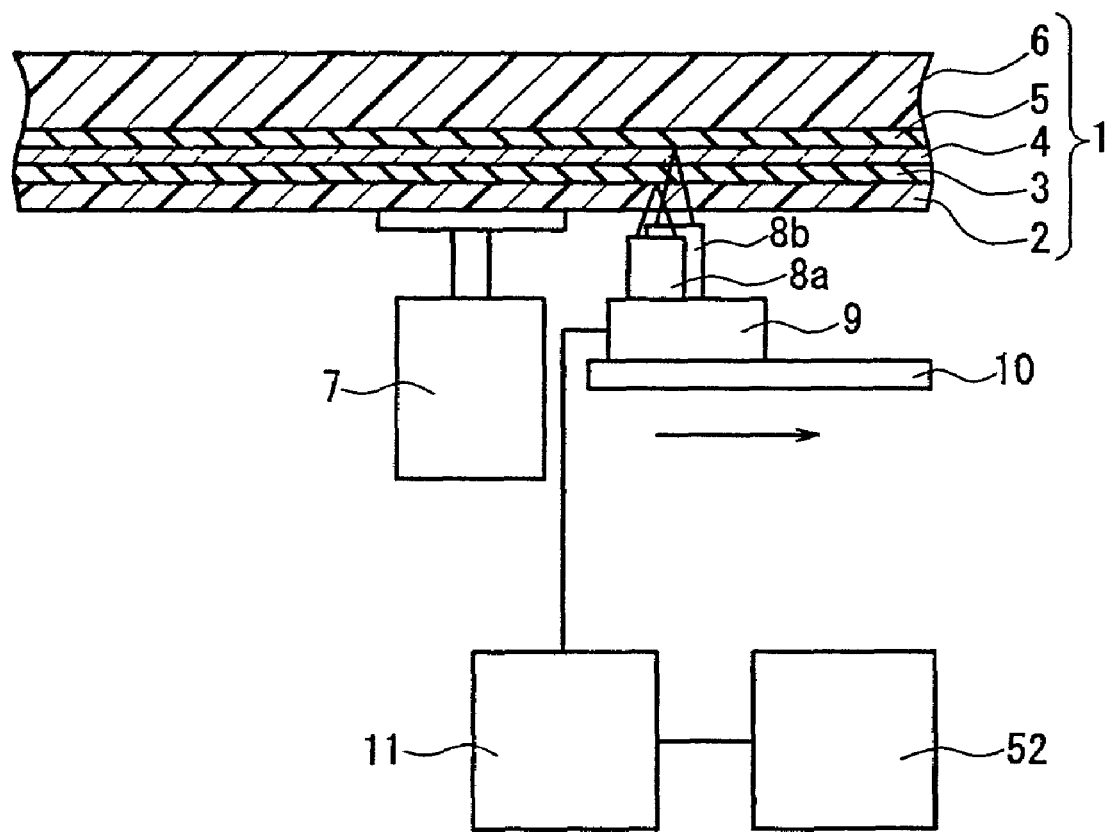
FIG. 9 is a partially cross-sectional view illustrating an initialization device for use with an optical information recording medium according to a fourth embodiment of the present invention.

FIG. 9 is a view illustrating a configuration of an initialization device according to the present embodiment, in a state of being used with respect to the information recording medium 1 having two recording layers that is employed in the second embodiment. The initialization device has an identical configuration to that of the first embodiment shown in FIG. 1 except that a counter 52 for counting times of up-and-down movements of the objective lens is provided. The initialization device includes the optical head shown in FIG. 2.

To initialize the recording layer 3, at an initial stage of the initialization, the control by the controller 11 causes a light beam emitted from the optical head 8a to have an intensity sufficient for the initialization, and drives the voice coil 17 shown in FIG. 2 to cause the objective lens 16 to move up and down so that the focus position of the light beam moves up and down a predetermined times. A range in which the focus position of the light beam is moved is set so as to include at least the recording layer 3, and herein, it is set to be 100 μm with respect to a predetermined position. Here, the counter 52 counts the up-and-down movements of the objective lens, and the number of the movements is controlled by the controller 11.

This action partially crystallizes the recording layer 3, and a reflected light from the recording layer 3 that now has an increased reflectance due to the partial crystallization is employed for causing the optical head 8a to focus on the recording layer 3. This allows the light beam to be focused on the recording layer 3 surely for initialization.

The number of the up-and-down movements of the objective lens is set according to a relative speed of the recording medium and the optical head and the speed of the up-and-down movements, and it preferably is set to be not less than two.

The foregoing initializing method is effective particularly for initializing a recording medium in which the recording layer 3 in the amorphous state has a very low reflectance with respect to a light beam with a wavelength at a level of the light beam emitted from the optical head 8a.

An optical information recording medium according to an embodiment of the present invention has a configuration identical to that of the multilayer recording medium shown in FIG. 12 except for the thickness of the layers, and the recording layer 3 has a reflectance of 1% in the amorphous state and a reflectance of 6% in the crystalline state, and a transmittance of 60% in the amorphous state and a transmittance of 30% in the crystalline state, whereas the recording layer 5 has a reflectance of 15% in the amorphous state and a reflectance of 10% in the crystalline state. In a state in which the recording layer 5 has been initialized already while the recording layer 3 is not initialized yet, 3.6% (10%×60%×60%) of light is reflected from the recording layer 5, while 1% of the light is reflected from the recording layer 3.

Figure 10A:
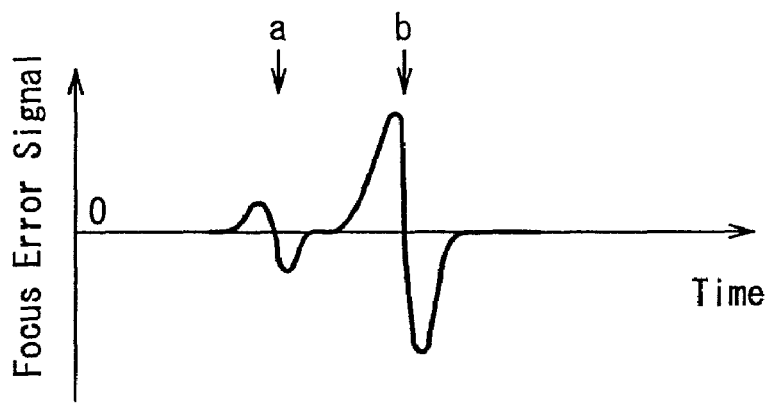
FIGS. 10A, 10B, and 10C are waveform diagrams illustrating examples of focus error signals obtained from the initialization device for use with an optical information recording medium according to the fourth embodiment of the present invention.

Therefore, in the case where a common technique such as the knife-edge method or the astigmatism method is used for focusing the light beam, an intensity ratio between a focus error signal obtained from the recording layer 3 and a focus error signal obtained from the recording layer 5 is 1/3.6, which is very small. FIG. 10A illustrates the intensities of focus error signals obtained from the recording layers: arrows a and b indicate sigmoidal curves representing signals from the recording layers 3 and 5, respectively.

The focus error signal from the recording layer 5 has an intensity three times or more that of the focus error signal from the recording layer 3. Therefore, in the case of the recording layer 1 in which a distance between the recording layer 3 and the recording layer 5 is as short as 0.04 mm, it is difficult to make the focus error signals obtained from the recording layers 3 and 5, that is, the sigmoidal curves, distinct from each other. As a result, the light beam is focused on the recording layer 5 with a greater amount of reflected light therefrom, and it is difficult to focus the light beam on the recording layer 3 with a smaller amount of reflected light therefrom. Thus, it is difficult to initialize the recording layer 3 by focusing the crystallization beam thereon.

Figure 10B:
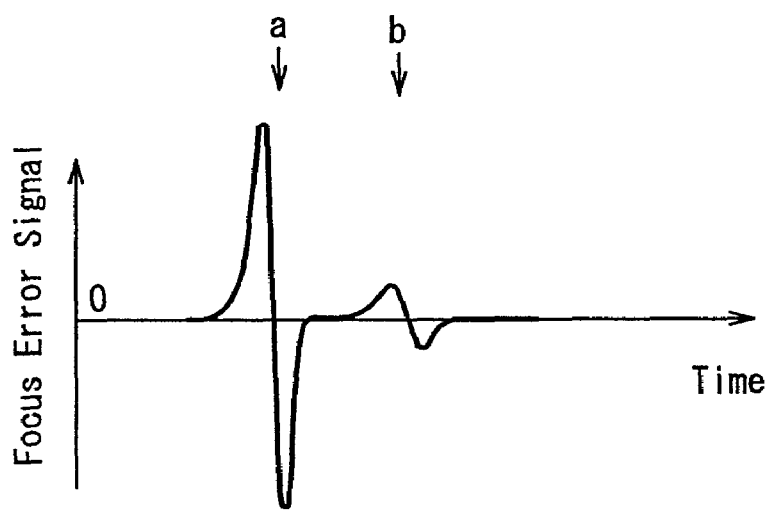

However, by partially crystallizing the recording layer 3 with an intensity of the light beam sufficient for the initialization and with the up-and-down movements of the focus position of the optical head 8a at an initial stage of the initialization of the recording layer 3, 6% of the light is reflected from the recording layer 3 and 0.9% (10%×30%×30%) of the light is reflected from the recording layer 5. Accordingly, an intensity ratio between the focus error signals obtained from the recording layers 3 and 5 is 6/0.9. FIG. 10B illustrates intensities of the focus error signals obtained from the recording layers: arrows a and b indicate sigmoidal curves representing signals from the recording layers 3 and 5, respectively. The focus error signal from the recording layer 3 has a significantly greater intensity, which ensures the focusing on the recording layer 3.

Figure 10C:
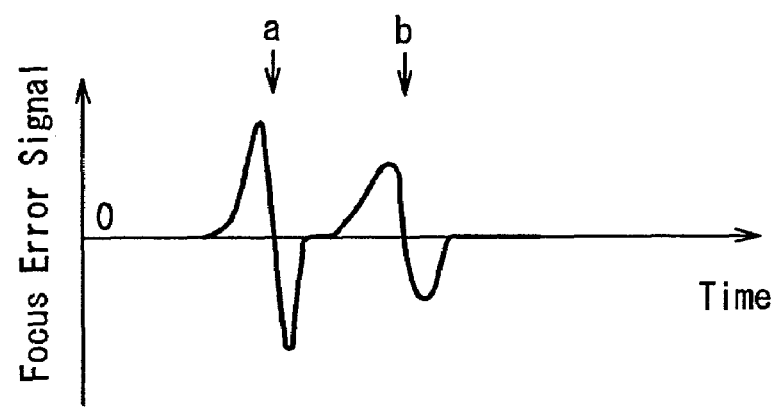

Furthermore, FIG. 10C illustrates intensities of focus error signals obtained from the recording layers during the initialization: arrows a and b indicate sigmoidal curves representing signals from the recording layers 3 and 5, respectively. In the case of the present embodiment in which a spot of each light beam on the recording layer has a dimension of 100 µm in a radial direction of the recording medium and a transfer pitch is 50 µm, a half of the light beam spot falls on an initialized portion. Therefore, 3.5% ((1%+6%)/2) of the light is reflected from the recording layer 3, while 2.25% ((3.6%+0.9%)/2) of the light is reflected from the recording layer 5. Consequently, an intensity ratio between the focus error signals obtained from the recording layers 3 and 5 is 3.5/2.25, which is sufficiently great, and hence, it is possible to focus the light beam on the recording layer 3 surely.

Therefore, the optical information recording medium having a plurality of recording layers according to the present embodiment is a high-performance multilayer recording medium without initialization irregularities in recording layers.

It should be noted that the relationship between the shape of the light beam spot and the transfer pitch preferably is set so that the focus error signal obtained from the recording layer 3 is greater than the focus error signal obtained from the recording layer 5.

Furthermore, as a technique for increasing a range subjected to the initialization by decreasing a range of the up-and-down movements of the objective lens, a technique can be applied in which a light beam first is focused later on a recording layer that reflects much light thereby producing a greater amplitude of a sigmoidal curve, so that a position of the other layer is determined and thereafter initialized.

In the initialization of the recording layer 3, the following operation preferably is performed: a focusing operation is performed for focusing the light beam emitted from the optical head 8a on the recording layer 5, then, after stopping the focusing operation, the focus position of the optical head 8a is moved down 0.04 mm, which is equivalent to a distance between the recording layer 3 and the recording layer 5, and thereafter, the optical head 8a is moved up and down while causing the same to emit a light beam with an intensity sufficient for the initialization. This allows the focus position of the light beam to pass surely through the recording layer 3 with short-distance up-and-down movements of the optical head 8a. This ensures the partial crystallization of the recording layer 3 at an initial stage of the initialization, and prevents the optical head 8a from colliding against the recording medium. Here, in the case where the recording layer 3 is crystallized partially by error before the light beam is focused on the recording layer 5, the light reflected from the recording layer 3 increases while the light reflected from the recording layer 5 decreases, which possibly causes the recording layer 3 to be mixed up with the recording layer 5, thereby producing an error in determining the position of the optical head 8a for initializing the recording layer 3. Therefore, in the case where the light beam is focused on the recording layer 5, the light beam preferably has an intensity such that the light beam does not crystallize the recording layer 3. This prevents the partial crystallization of the recording layer 3 by error before the focusing of the light beam on the recording layer 5. In other words, it is possible to set the position of the optical head 8a in the initialization of the recording layer 3.

Fifth Embodiment

Figure 11:
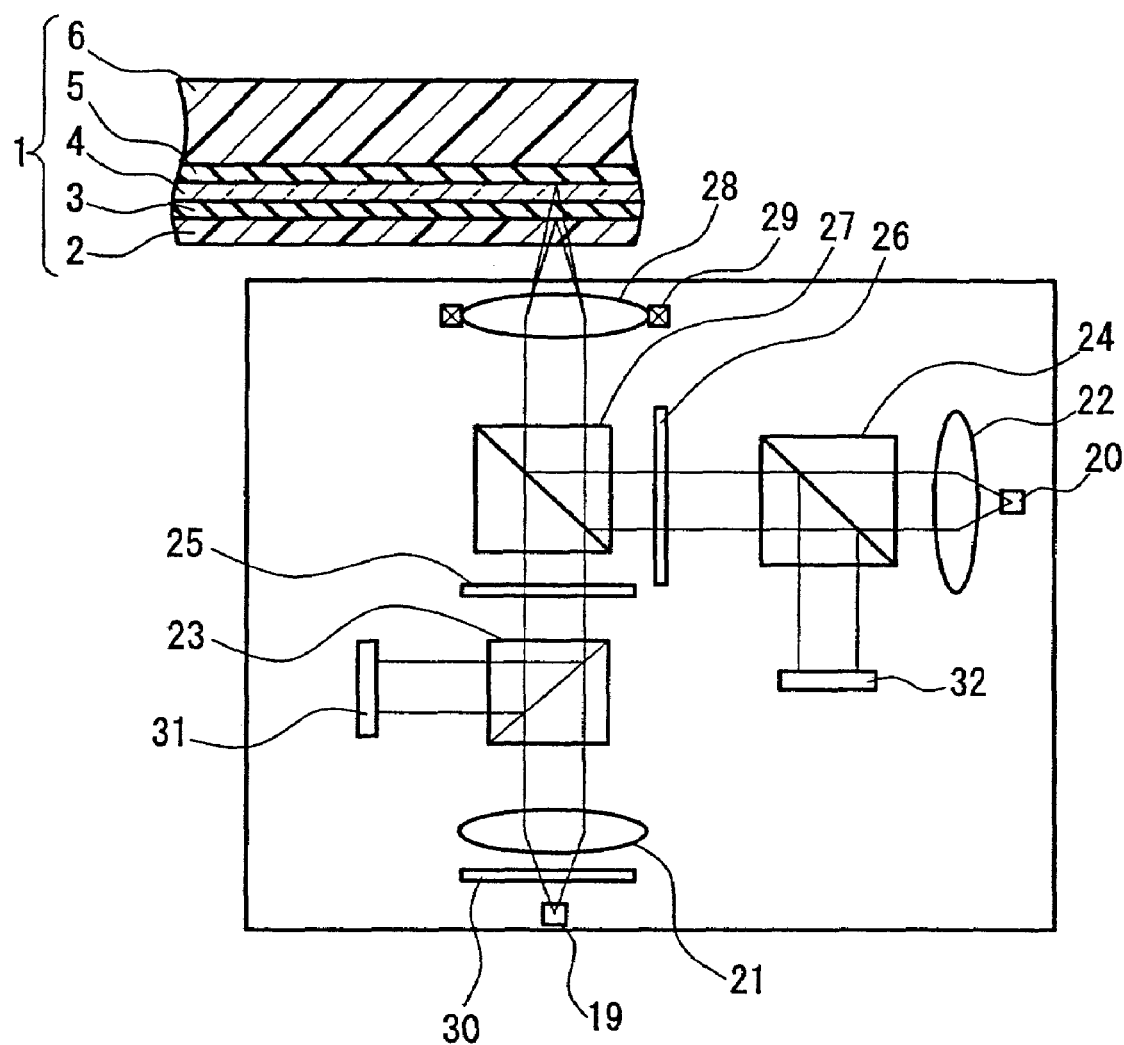
FIG. 11 is a partially cross-sectional view illustrating an initialization device for use with an optical information recording medium according to a fifth embodiment of the present invention.

An initialization device for use with an optical information recording medium according to the fifth embodiment of the present invention has a configuration identical to that of the initialization device for use with an optical information recording medium according to the first embodiment shown in FIG. 1, except for the optical head. The optical head of the present embodiment is shown in FIG. 11. The optical head includes light sources 19 and 20 that are composed of semiconductor lasers emitting light beams with different wavelengths, which are 680 nm and 800 nm, respectively.

In FIG. 11, a wavelength-selective mirror 27 transmits light with a wavelength at a level of the light emitted from the light source 19, and reflects light with a wavelength at a level of the light emitted from the light source 20. The light beam emitted from the light source 20 passes through a collimator lens 22, a beam splitter 24, and a quarter-wavelength plate 26, and is reflected by the wavelength-selective mirror 27, and is focused by an objective lens 28 on the recording layer 5. The light beam reflected from the recording layer 5 again passes through the objective lens 28, is reflected by the wavelength-selective mirror 27, passes through the quarter-wavelength plate 26, and is reflected by the beam splitter 24, thereby entering a detector 32, where the beam is converted into electric signals. The electric signals are used for controlling a voice coil 29. On the other hand, the light beam emitted from the light source 19 passes through an optical path correction system 30 composed of a liquid crystal element, a collimator lens 21, a beam splitter 23, and a quarter-wavelength plate 25, transmits through the wavelength-selective mirror 27, and is focused on the recording layer 3 by the objective lens 28. The light beam reflected from the recording layer 3 again passes through the objective lens 28, the wavelength-selective mirror 27, and the quarter-wavelength plate 25, and is reflected by the beam splitter 23, thereby entering a detector 31, where the beam is converted into electric signals. The electric signals are used for controlling the optical path correction system 30.

The light beam emitted from the light source 20 is focused on the recording layer 5, which is one of the two recording layers of the recording medium 1, by the voice coil 29 that adjusts the position of the objective lens 28. When attempting to focus the light beam emitted form the light source 19 accurately on the other recording layer 3, deviations incurred by fluctuations of the position of the recording layer due to fluctuations of the recording medium 1 are common between the recording layers 3 and 5, and therefore, such a deviation can be compensated by focusing the light beam from the light source 20 on the recording layer 5, as described above. However, deviations incurred by thickness irregularities or the like of the transparent separation layer 4 are independent from the recording layer 5, and hence, such a deviation cannot be compensated by the foregoing method.

To compensate such a fluctuation peculiar to the recording layer 3, the initialization device of the present embodiment varies the intensity and phase distribution of the light beam by operating the optical path correction system 30, so as to adjust a focus position according to the thickness irregularities of the transparent separation layer 4. By so doing, the initialization device is capable of focusing the light beam emitted from the light source 19 on the recording layer 3 precisely.

Therefore, in the initialization device according to the present embodiment, it is possible to focus a light beam emitted from one light source on a specific recording layer by moving an objective lens, and at the same time, to focus a light beam emitted from another light source on another recording layer by means of the foregoing optical path correction system. This makes it possible to focus light beams emitted from a plurality of light sources on respective target recording layers precisely at the same time, even in the case where the transparent separation layer 4 in the recording medium has a thickness different from a designed one or has a thickness involving irregularities. Thus, the stable initialization without irregularities is achieved. Furthermore, in the case where the same objective lens is used, the focus distance is shorter with respect to a light with a short wavelength than with respect to a light with a long wavelength. Therefore, the light sources 19 and 20 may be configured so that the light source 19 used for initializing the recording layer 3 of the recording medium closer to the light beam incidence surface emits a light with a shorter wavelength than that of the light emitted from the light source 20 used for initializing the recording layer 5 farther from the light beam incidence surface, whereby the designing of the optical system can be facilitated.

It should be noted that a liquid crystal element is employed as the optical path correction system in the foregoing embodiment, but the optical path correction system may be configured by employing a lens having a movable mechanism such as a piezoelectric element, and may be positioned between the collimator lens 21 and the beam splitter 23.

Furthermore, the optical path correction system 30 may be positioned on an optical path of the light beam emitted from the light source 20, and an operation for focusing the light beam emitted from the light source 19 on the recording layer 5 is carried out by means of the voice coil 29 that adjust a position of the objective lens 28, so that the focus position of the light beam emitted from the light source 20 should be adjusted by operating the optical path correction system 30.

Furthermore, an example in which the position of the light beam projected to the recording layer 5 is displaced in the optical head moving direction relative to the position of the light beam projected to the recording layer 3 so that the two light beams do not overlap each other on the recording layers achieves an advantage in that the recording layer 5 can be initialized without the influence of the initialization irregularities of the recording layer 3.

Furthermore, in the foregoing embodiment, the light beam emitted from the light source 19 used for initializing the recording layer 3 that is closer to the light beam incidence surface of the recording medium is set so as to have a wavelength shorter than that of the light beam emitted from the light source 20 used for initializing the recording layer 5 that is farther from the light beam incidence surface, but the wavelength of the light source 19 may be set to be longer than the wavelength of the light source 20, for instance, in the case where the recording layer 3 is made of a material whose transmittance increases as the wavelength decreases.

Furthermore, the number of the light sources may be not less than three, and there is no need to match the same with the number of the recording layers of the recording medium.

Furthermore, semiconductor lasers emitting light beams with different wavelengths are employed as light sources, but they may be light sources emitting light beams with the same wavelength in the case where another means is employed for separating reflected lights from the recording medium of light beams emitted from different light sources, for instance, by setting at different angles the optical paths of the light beams emitted from the light sources 19 and 20 so that reflected lights from the recording medium are focused at different positions in the detector.

In the aforementioned first through fifth embodiments, the wavelengths of the light sources and the numerical aperture of the objective lens can be designed appropriately according to the optical characteristics of recording layers, a thickness of a substrate, etc., of a recording medium as a target of the initialization.

Furthermore, the foregoing is described referring to an information recording medium in a disc form, but the present invention can be applied to multilayer recording media in other forms such as a card type.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for initializing an optical information recording medium having a plurality of recording layers, the method comprising:

partially initializing at least one of the recording layers at an initial stage of the initialization by moving up and down a focus position of an optical head with a light beam having an intensity sufficient for initialization;

focusing the focus position on the partially initialized portion of the recording layer; and initializing the recording layer.

2. The method for initializing an optical information recording medium having a plurality of recording layers according to claim 1, further comprising:

projecting different light beams to the plurality of recording layers, respectively, wherein at a position at a same distance in a radial direction on the optical information recording medium, the recording layer positioned farther from a light beam irradiation side is irradiated with one light beam before the recording layer positioned closer to the light beam irradiation side is irradiated with another light beam so that the plurality of recording layers are initialized at the same time by a light beam projecting operation in which the light beams are focused at different positions.

3. The method for initializing an optical information recording medium having a plurality of recording layers according to claim 1, wherein a focus position is focused at a recording layer from which a greater reflected light amount is obtained than a reflected light amount obtained from a target recording layer, with a light beam having an intensity with which the target recording layer is not initialized, and thereafter a focus position of an optical head is moved up and down with respect to a position at a predetermined distance therefrom in a thickness direction of the recording medium so that the target recording layer is initialized partially.

4. An initialization device for initializing an optical information recording medium having a plurality of recording layers, comprising:

a plurality of optical heads provided to face a same surface of a recording medium for irradiating different recording layers with light beams, respectively, wherein at least one of the plurality of optical heads includes a driving system for moving an objective lens equipped in the optical head, a counter for counting up-and-down movements of the objective lens, and a controller for controlling an intensity of the light beam emitted from the optical head and for controlling the driving system, and wherein for initializing at least one of the recording layers, the controller performs a controlling operation that includes:

partially initializing at least one of the recording layers at an initial stage of the initialization by moving up and down a focus position of an optical head with a light beam having an intensity sufficient for initialization;

focusing the focus position on the partially initialized portion of the recording layer; and initializing the recording layer.

\* \* \* \* \*